US012643605B2

(12) United States Patent
Bae et al.

(10) Patent No.: US 12,643,605 B2
(45) Date of Patent: Jun. 2, 2026

(54) INDEPENDENT STEERING DEVICE HAVING A STEERING ANGLE MEASURING DEVICE AND A VEHICLE INCLUDING THE SAME

(71) Applicants: HYUNDAI MOTOR COMPANY, Seoul (KR); KIA CORPORATION, Seoul (KR); SEOHAN INNOBILITY CO., LTD., Chungcheongbuk-do (KR)

(72) Inventors: Jin Ho Bae, Suwon-si (KR); Hyeong Seop Park, Hwaseong-si (KR); Chang Seop An, Incheon (KR); Min Sang Seong, Yongin-si (KR); Jae Geun Bang, Hwaseong-si (KR); Jung Min Cho, Hwaseong-si (KR); Seong Kweon Joo, Hwaseong-si (KR)

(73) Assignees: HYUNDAI MOTOR COMPANY, Seoul (KR); KIA CORPORATION, Seoul (KR); SEOHAN INNOBILITY CO., LTD., Chungcheongbuk-do (KR)

( * ) Notice: Subject to any disclaimer, the term of this patent is extended or adjusted under 35 U.S.C. 154(b) by 112 days.

(21) Appl. No.: 18/734,568

(22) Filed: Jun. 5, 2024

(65) Prior Publication Data

US 2025/0214649 A1 Jul. 3, 2025

(30) Foreign Application Priority Data

Dec. 27, 2023 (KR) ......................... 10-2023-0192440

(51) Int. Cl.
| | |
|---|---|
| *B62D 15/02* | (2006.01) |
| *B62D 7/06* | (2006.01) |
| *B62D 7/18* | (2006.01) |

(52) U.S. Cl.
CPC ............. *B62D 15/023* (2013.01); *B62D 7/06* (2013.01); *B62D 7/18* (2013.01)

(58) Field of Classification Search
CPC .......... B62D 15/023; B62D 7/06; B62D 7/18; B62D 5/0418; B62D 5/0403; B62D 5/0457; B62D 15/021
See application file for complete search history.

(56) References Cited

U.S. PATENT DOCUMENTS

| | | | | |
|---|---|---|---|---|
| 11,377,083 | B2 * | 7/2022 | Smith ..................... | B60T 1/065 |
| 11,865,922 | B2 * | 1/2024 | Ameye .................. | B62D 7/023 |
| 12,220,958 | B2 * | 2/2025 | Chang ..................... | B60G 7/04 |

(Continued)

*Primary Examiner* — Jason D Shanske
*Assistant Examiner* — Joselynn Y Sliteris
(74) *Attorney, Agent, or Firm* — Lempia Summerfield Katz LLC

(57) ABSTRACT

An independent steering device includes a knuckle coupled to a wheel and a driving unit including a motor and a reducer. The motor provides driving force for rotating the knuckle. At least a portion of the reducer is rotatably connected to the knuckle and decelerates a rotational movement of the motor and transmits the rotational movement to the knuckle. The independent steering device further includes a steering angle measuring device coupled to the knuckle and the driving unit and measuring a steering angle of the wheel. The steering angle measuring device includes a body coupled to the knuckle and rotates with the knuckle, a shaft rotatably coupled to the body, and a rod coaxially extending from the shaft and fixed to at least a portion of the driving unit.

14 Claims, 13 Drawing Sheets

(56)  References Cited

U.S. PATENT DOCUMENTS

| | | | | |
|---|---|---|---|---|
| 12,344,066 | B2 * | 7/2025 | Choi | B60G 3/20 |
| 2023/0391154 | A1 * | 12/2023 | Choi | B60G 3/265 |
| 2023/0391181 | A1 * | 12/2023 | Min | B62D 5/0418 |
| 2023/0391392 | A1 * | 12/2023 | Choi | B62D 65/04 |
| 2024/0100898 | A1 * | 3/2024 | Chang | B60G 3/18 |
| 2025/0083742 | A1 * | 3/2025 | Seong | B62D 7/18 |
| 2025/0222976 | A1 * | 7/2025 | Yu | B60K 17/043 |

* cited by examiner

INDEPENDENT STEERING DEVICE HAVING A STEERING ANGLE MEASURING DEVICE AND A VEHICLE INCLUDING THE SAME

CROSS-REFERENCE TO RELATED APPLICATION(S)

This application claims benefit of priority to Korean Patent Application No. 10-2023-0192440 filed on Dec. 27, 2023 in the Korean Intellectual Property Office, the disclosure of which is incorporated herein by reference in its entirety.

BACKGROUND

1. Field

The present disclosure relates to an independent steering device having a steering angle measuring device and to a vehicle including the same.

2. Description of Related Art

In general, power steering systems have complex configurations, for example, including a pump, a gearbox that also serves as a power cylinder, piping, and the like. Generally, power steering systems have difficulties in precisely controlling steering assistance force. Additionally, there may be problems with the power steering not operating when oil is leaked. Since the left and right wheels of a vehicle are controlled dependently, if a problem occurs in the operation of the steering device, steering control of the vehicle may be impossible, resulting in a risk of injury to occupants of the vehicle and others proximate to the vehicle.

To prevent this problem, a method of implementing independent steering for each wheel is being developed by applying an electric steering device using a motor to enable steering with a simple configuration and precise control of assist force.

On the other hand, vehicles equipped with a general power steering system are mechanically connected from the steering wheel to the tires, and thus the tire steering angle may be estimated from the rotation angle of the steering wheel. However, there may be errors in the estimated tire steering angle due to various factors such as torsion bar twisting, mechanical part tolerance, vehicle geometry inaccuracy, bush compliance, and the like.

SUMMARY

An aspect of the present disclosure is to provide an independent steering device equipped with a steering angle measuring device disposed inside a reducer and a knuckle and capable of directly measuring a steering angle of a wheel. Another aspect of the present disclosure is to provide a vehicle including the same.

According to an aspect of the present disclosure, an independent steering device includes a knuckle coupled to a wheel and a driving unit including a reducer and a motor configured to provide driving force for rotating the knuckle. At least a portion of the reducer is rotatably connected to the knuckle. The reducer is configured to decelerate a rotational movement of the motor and transmit the rotational movement to the knuckle. The independent steering device also includes a steering angle measuring device coupled to the knuckle and the driving unit and configured to measure a steering angle of the wheel. The steering angle measuring device includes a body coupled to the knuckle and configured to rotate with the knuckle, a shaft rotatably coupled to the body, and a rod coaxially extending from the shaft and fixed to at least a portion of the driving unit.

The steering angle measuring device may be configured to detect a degree to which the body rotates while the shaft and the rod maintain a fixed state relative the body when the knuckle rotates.

The steering angle measuring device may further include a coupling connecting the rod to the shaft.

The rod and the shaft may be integrated.

The driving unit may further include a bracket to which the motor and the reducer are coupled to a lower surface thereof in parallel, and a cover coupled to an upper surface of the bracket, and the rod may penetrate through at least an additional portion of the reducer and may have one end fixed to a holder provided on the cover.

The driving unit may further include a power transmission member disposed in a space between the cover and the bracket, connecting a first rotation shaft of the motor and a second rotation shaft of the reducer, and configured to transmit rotational force between the first rotation shaft and the second rotation shaft.

The second rotation shaft may have a through-hole penetrating therethrough in an axial direction. The rod may pass through the through-hole and may be fixed to the holder and an outer peripheral surface of the rod may be spaced apart from an inner peripheral surface of the through-hole.

The motor and the reducer may be coupled to the lower surface of the bracket. The first rotation shaft and the second rotation shaft may penetrate through the bracket and may be located on the upper surface of the bracket. The power transmission member may be connected to the first rotation shaft and the second rotation shaft, on the upper surface of the bracket.

The reducer may further include a housing fixed to the bracket and disposed such that the second rotation shaft may rotate. The reducer may also include an output unit at least partially disposed inside the housing and configured to rotate relative to the housing in conjunction with rotation of the second rotation shaft. The knuckle may be connected to the output unit to rotate integrally with the output unit.

The power transmission member may include a first pulley coupled to the first rotation shaft, a second pulley coupled to the second rotation shaft, and a belt connecting the first pulley to the second pulley. A rotational movement of the first rotation shaft may be reduced at a predetermined reduction ratio by the power transmission member.

The second pulley may be inserted into the second rotation shaft and the rod may pass through the second pulley and may protrude by a predetermined length.

The driving unit may be coupled to a vehicle body by a connecting member, and the housing and the holder of the reducer may be separated from rotation of the knuckle when the knuckle rotates and remain fixed to the vehicle body.

The knuckle may include a first coupling portion to which the reducer is coupled and a second coupling portion to which the wheel is coupled. The first coupling portion may be provided with a coupling hole into which at least a portion of the body is inserted.

The knuckle may be provided with a recess in which at least a portion of the body is disposed between the first coupling portion and the second coupling portion.

The reducer may be a harmonic drive reducer.

BRIEF DESCRIPTION OF DRAWINGS

The above and other aspects, features, and advantages of the present disclosure should be more clearly understood from the following detailed description, taken in conjunction with the accompanying drawings, in which.

DETAILED DESCRIPTION

Figure 1:
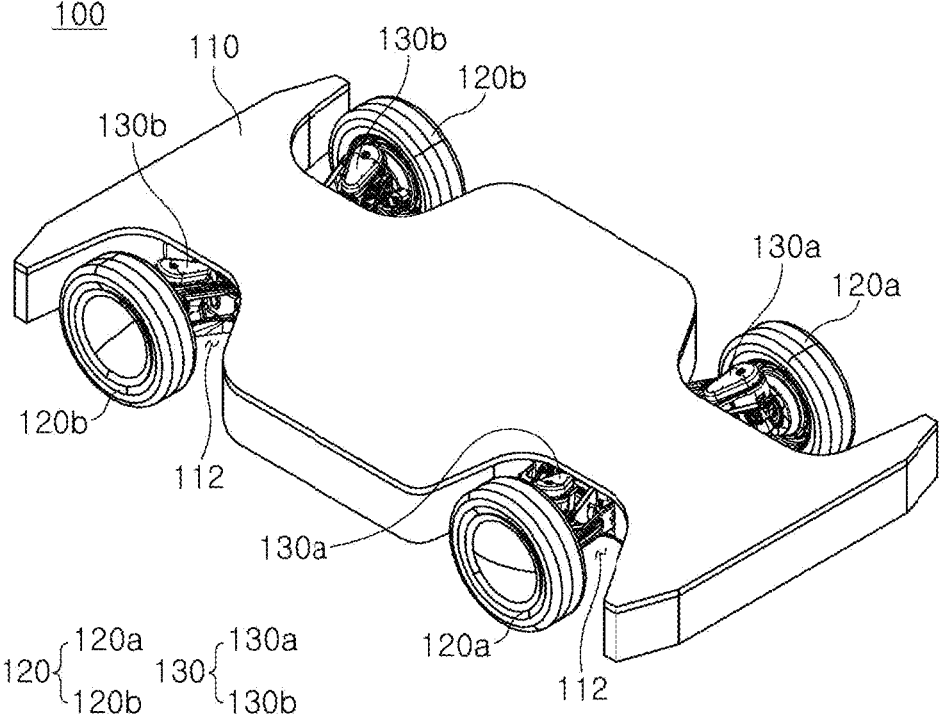
FIG. 1 is a perspective view illustrating a vehicle to which a steering device according to an embodiment is applied.

The present disclosure includes various embodiments illustrated in the drawings and described in detail. Various changes may be made to the disclosed embodiments. Thus, the present disclosure is not intended to be limited to the illustrated and described embodiments. It should be understood that the embodiments of the present disclosure include all modifications, equivalents, and substitutes included in the spirit and scope of the present disclosure.

Terms such as first and second may be used to describe various components, but the components should not be understood as being limited by these terms. These terms are only used for distinguishing one component from another. For example, a first element may be termed a second element, and similarly, a second element may be termed a first element, without departing from the scope of the present disclosure. The term 'and/or' includes a combination of a plurality of related recited items or any one of a plurality of related recited items.

Terms used in this specification are only used to describe embodiments of the present disclosure and are not intended to limit the present disclosure. Singular expressions include plural expressions unless the context clearly dictates otherwise. In this application, the terms "include," "have" and the like are intended to designate that there is a feature, number, step, operation, component, part, or combination thereof described in the specification. However, it should be understood that these terms do not preclude the possibility of the presence or addition of one or more other features, numbers, steps, operations, components, parts, or combinations thereof.

Unless defined otherwise, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art. Unless expressly defined in this application, such terms are not to be construed in an ideal or overly formal sense.

Hereinafter, embodiments are described with reference to the drawings. When a component, device, element, or the like of the present disclosure is described as having a purpose or performing an operation, function, or the like, the component, device, or element should be considered herein as being "configured to" meet that purpose or perform that operation or function.

Figure 2:
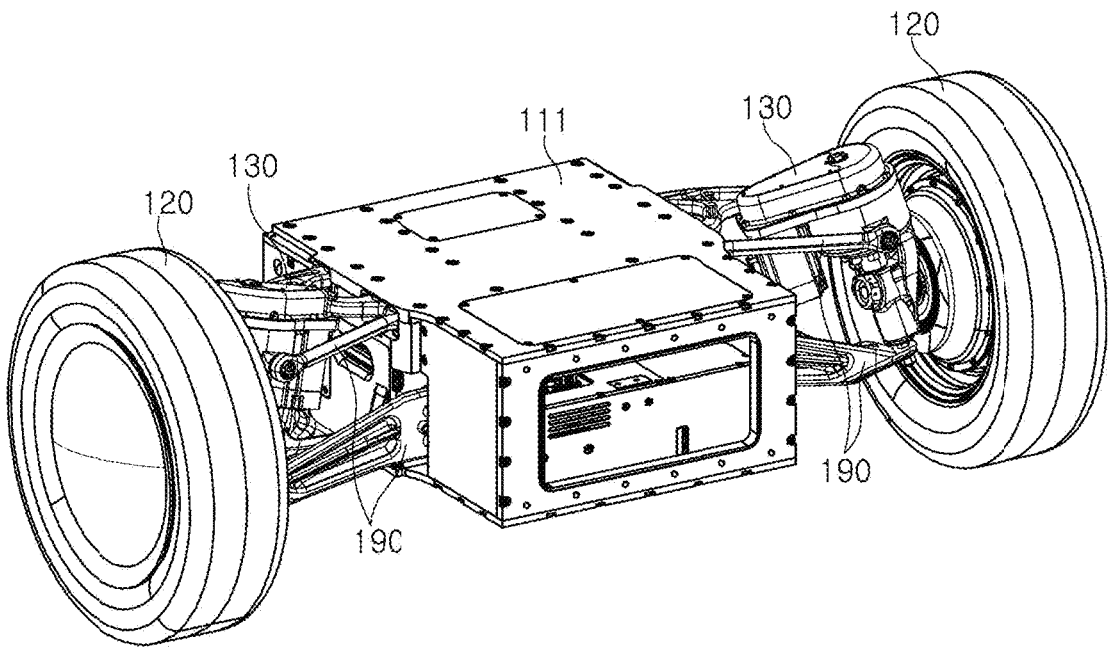
FIG. 2 is a diagram illustrating a connection structure between a steering device and a body of a vehicle according to an embodiment.

FIG. 1 is a perspective view illustrating a vehicle 100 to which a steering device 130 according to an embodiment is applied. FIG. 2 is a diagram illustrating the connection structure between the steering device 130 and a body 110 of the vehicle 100 according to an embodiment.

The steering device 130 according to an embodiment is a vehicle steering device applied to the vehicle 100. In this case, the vehicle 100 refers to various vehicles that move or transport objects, such as people, animals, or goods, from a starting point to a destination. These vehicles are not limited to vehicles traveling on roads or tracks.

The steering device 130 according to an embodiment may be provided in a structure that is respectively connected to a plurality of wheels 120 provided in the vehicle 100 to independently steer each wheel 120. The steering device 130 may secure the steering angle of the wheels 120 up to about 90 degrees.

Referring to FIGS. 1 and 2, the vehicle 100 according to an embodiment may include the body 110, the wheels 120, the steering device 130, and a connecting member 190.

The vehicle 100 illustrated in FIG. 1 is schematically illustrated, and the components included in the vehicle 100 are not necessarily limited to the components illustrated. According to various embodiments, the vehicle 100 may further include other or additional components.

The body 110 is a configuration in which the wheel 120, the steering device 130, and the connecting member 190 are coupled and mounted. The body 110 may be moved and a direction in which the body 110 is moved may be adjusted by driving the wheel 120 and the steering device 130. One side of the connecting member 190 is fixed to the body 110. The steering device 130 and the wheel 120 are connected to the other side of the connecting member 190 and may be mounted on the body 110.

The body 110 may include a chassis module 111 to which the connecting member 190 is coupled. The chassis module 111 may form part of the body 110 or may be coupled to the base of the body 110. For example, it may be understood that FIG. 1 illustrates the vehicle 100 in the state in which the chassis module 111 illustrated in FIG. 2 is disposed inside the body 110 and the connecting member 190 is coupled to the chassis module 111.

The connecting member 190 may be coupled to the chassis module 111. For example, the connecting members 190 for connecting two steering devices 130 may be coupled to both sides of the chassis module 111, respectively. Two wheels 120 may be coupled to the two steering devices 130, respectively.

The body 110 of the vehicle 100 illustrated in FIG. 1 may be referred to as a floor portion. The chassis module 111 of FIG. 2 may be installed under the floor and not exposed to the outside. According to various embodiments, the vehicle 100 may have an interior space installed on the upper part of the floor, in which users may board or cargo may be loaded, and the interior space may be equipped with seats, a steering wheel, and the like.

The body 110 may be provided with a wheel house 112, which is a predetermined space where the wheel 120 and the steering device 130 are mounted. The wheel house 112 may be sized to ensure a steering angle of the wheel 120 of up to about 90°. For example, in the wheel house 112, in order for the wheel 120 to rotate at a steering angle of about 90°, a separation space corresponding to the diameter of a tire 122 is required in the width direction (for example, the minor axis direction of the vehicle 100 in FIG. 1) in which the steering device 130 extends.

According to an embodiment, the space of the wheel house 112 designed for steering the wheel 120 at about 90 degrees may be used as an arrangement space for the steering device 130. Accordingly, the steering device 130 may be installed substantially parallel to the body 110 without protruding above the wheel 120.

The wheel 120 may be coupled to the steering device 130. A plurality of wheels 120 may be provided, and a plurality of steering devices 130 may be provided to correspond in number to the plurality of wheels 120. For example, each wheel 120 of a plurality of wheels 120 may be coupled to respective or corresponding steering devices 130 of the plurality of steering devices 130 and may rotate around a kingpin axis (for example, a kingpin axis 145 in FIG. 4) by operating the steering device 130.

The plurality of wheels 120 may include four wheels, which may further include two front wheels 120a and two rear wheels 120b. In this case, the front and rear directions in which the front wheels 120a and the rear wheels 120b are provided are relative directions. Accordingly, the directions in which the front wheels 120a are disposed is not limited to a front of the vehicle 100. Similarly, the direction in which the rear wheels 120b are disposed is not limited to a rear of the vehicle 100. For example, two front wheels 120a may be respectively connected to two first steering devices 130a, and two rear wheels 120b may be connected to two second steering devices 130b. As used herein, a wheel 120 may generally be referencing any one of the front or rear wheels 120a, 120b and a steering device 130 may generically be referencing any one of the first or second steering devices 130a, 130b.

The steering device 130 may be provided to adjust the rotation angle of the wheel 120 according to the direction in which the vehicle 100 travels, without being mechanically connected to a steering wheel. The steering device 130 may independently control steering for each of the plurality of wheels 120. For example, the steering device 130 may operate to rotate the wheel 120 based on a steering signal input through a steering wheel (for example, a steering wheel SW in FIG. 10).

According to the illustrated embodiment, the steering device 130 is applied to a vehicle 100 equipped with four wheels 120 and may independently control steering for the four wheels 120. However, the number of wheels 120 is not limited to four, and the steering device 130 may be applied to vehicles with less than four wheels 120 or vehicles with more than four wheels 120.

The steering device 130 may include two first steering devices 130a to which two front wheels 120a are respectively connected and two second steering devices 130b to which two rear wheels 120b are respectively connected. According to the illustrated embodiment, the first steering devices 130a and the second steering devices 130b may have the same structure. This is only an example and thus the first steering device 130a and the second steering device 130b may have different structures. For example, based on FIG. 1, the second steering device 130b may be changed to a device configured using a linear actuator.

The connecting member 190 may connect the steering device 130 to the body 110 of the vehicle 100. For example, as one side of the connecting member 190 is coupled to the chassis module 111 of the body 110 and the steering device 130 is coupled to the other side of the connecting member 190, the steering device 130 may be mounted on the body 110.

The connecting member 190 may include a first connecting member 191 and a second connecting member 192. The first connecting member 191 may be coupled to a reducer 170 of the steering device 130, and the second connecting member 192 may be coupled to a knuckle 140 of the steering device 130.

The first connecting member 191 may connect the chassis module 111 and the reducer 170, above the upper portion of the second connecting member 192. The second connecting member 192 may connect the chassis module 111 and the knuckle 140, below the first connecting member 191. For example, the first connecting member 191 may be fixedly coupled to a portion of the chassis module 111 at a position adjacent to the upper surface (for example, the surface facing upward with respect to FIG. 2) of the chassis module 111. The second connecting member 192 may be fixedly coupled to a portion of the chassis module 111 at a position adjacent to the lower surface (for example, a downward facing surface with respect to FIG. 2) of the chassis module 111.

The connecting member 190 supports the steering device 130 and the wheel 120 using the first connecting member 191 and the second connecting member 192, thereby implementing a double wishbone suspension.

The structure in which the wheel 120, the steering device 130, and the connecting member 190 are connected to the body 110 is described in more detail below with reference to FIGS. 3-5.

Figure 3:
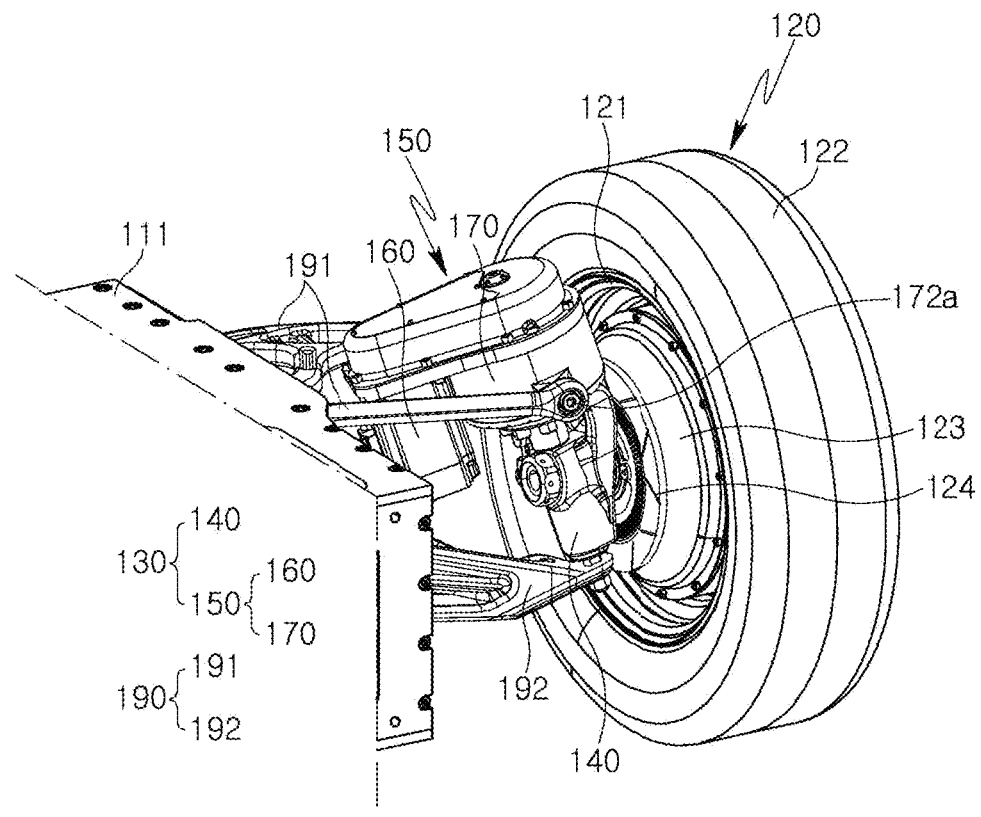
FIG. 3 is a perspective view illustrating a structure in which wheels, a steering device, a connecting member, and a body of a vehicle are connected according to an embodiment.

FIG. 3 is a perspective view illustrating a structure in which the wheel 120, the steering device 130, the connecting member 190, and the body 110 of the vehicle 100 are connected according to an embodiment. FIG. 4 is a front view illustrating a structure in which the wheel 120, steering device 130, connecting member 190, and body 110 of the vehicle 100 are connected according to an embodiment. FIG. 5 is a plan view illustrating a structure in which the wheel 120, steering device 130, connecting member 190, and body 110 of the vehicle 100 are connected according to an embodiment.

FIG. 3 is an enlarged view of portion A illustrated in FIG. 2. FIG. 4 is a diagram illustrating the configurations illustrated in FIG. 3 when viewed from the front. FIG. 5 is a diagram illustrating the configurations illustrated in FIG. 3 as viewed from above.

Figure 4:
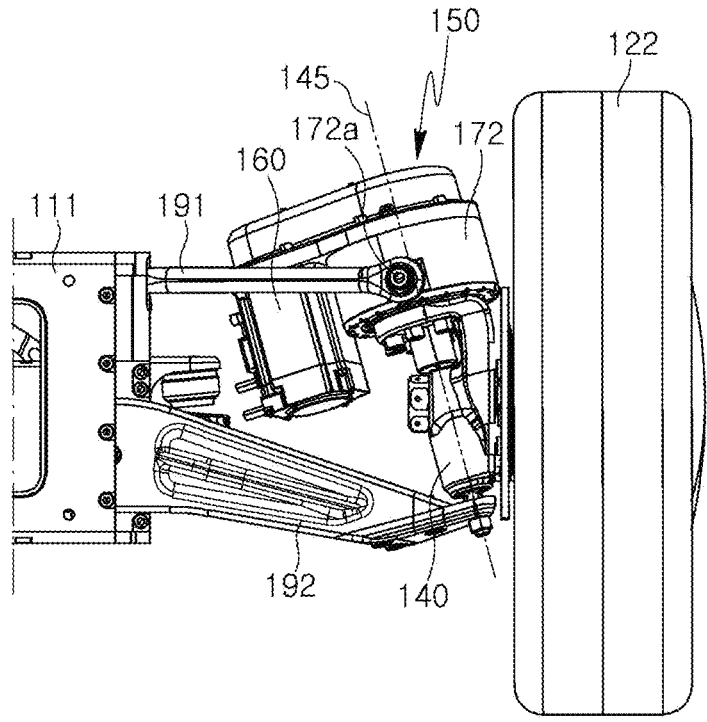
FIG. 4 is a front view illustrating a structure in which wheels, a steering device, a connecting member, and a body of a vehicle are connected according to an embodiment.
Figure 5:
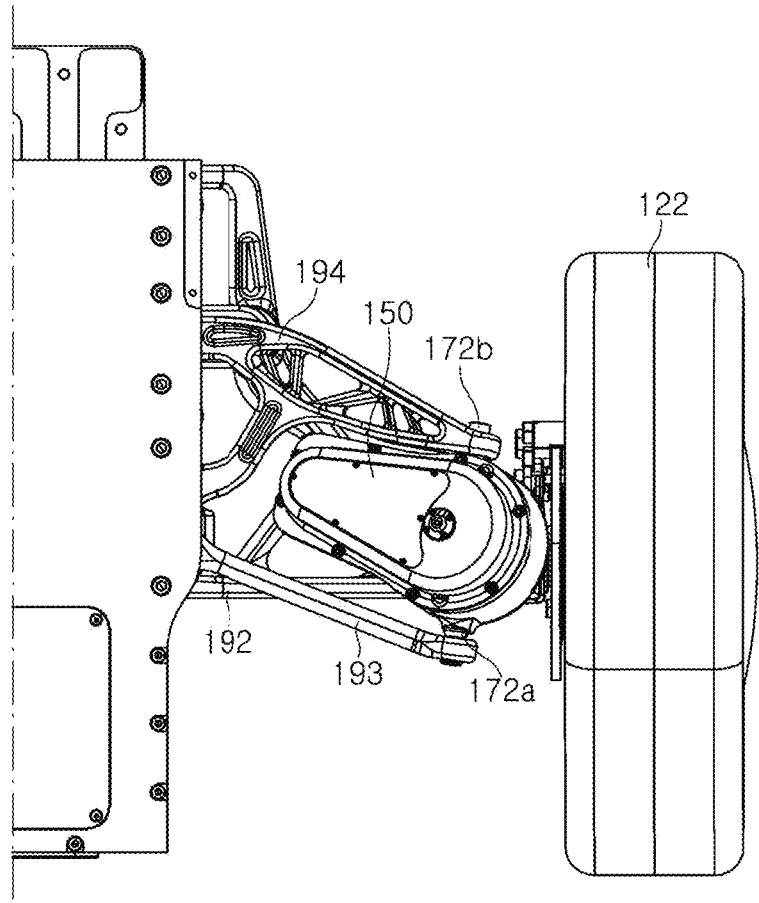
FIG. 5 is a plan view illustrating a structure in which wheels, a steering device, a connecting member, and a body of a vehicle are connected according to an embodiment.

Referring to FIGS. 3-5, the wheel 120 is coupled to the steering device 130, the steering device 130 is coupled to the connecting member 190, and the connecting member 190 may be coupled to the chassis module 111. For example, the steering device 130 may be connected to the chassis module 111 through the connecting member 190, and the wheel 120 may be connected to the chassis module 111 through the steering device 130.

According to an embodiment, an in-wheel motor driving method or an in-wheel system may be applied to each wheel 120 equipped with the steering device 130. For example, a motor is provided inside a wheel body 121 to provide driving force independently to each wheel 120. In addition, a steering device 130 is provided for each wheel 120 to independently control the steering angle of the wheel 120.

The wheel 120 may include a wheel body 121, a tire 122 disposed on the outer side of the wheel body 121, an in-wheel motor 123 disposed on an inner side of the wheel body 121, and a brake disc 124 coupled to the in-wheel motor 123.

The in-wheel motor 123 is an electric motor mounted inside the wheel body 121 to directly drive the wheel body 121. The in-wheel motor 123 provided on each wheel 120 may independently drive and control the wheels 120. According to various embodiments, the in-wheel motor 123 may be referred to as a hub motor or electric hub.

However, the illustrated embodiment is merely an example. The embodiments of the present disclosure are not limited to the form in which the steering device 130 is provided on a vehicle to which the in-wheel motor 123 is applied (for example, a vehicle to which an in-wheel system is applied). In the present disclosure, vehicles to which the steering device 130 is applied include vehicles equipped with general wheels 120 rather than in-wheel systems.

The steering device 130 may be disposed between the wheel 120 and the chassis module 111. The steering device 130 may include the knuckle 140 coupled to the wheel 120 and a driving unit 150 coupled to the knuckle 140.

The knuckle 140 is coupled to the wheel 120 and may rotate together with the wheel 120. For example, the wheel 120 may rotate by rotation of the knuckle 140. The knuckle 140 may form the kingpin shaft 145, which is the axis around which the wheel 120 rotates. The knuckle 140 may be coupled to a wheel shaft 123s of the wheel 120.

The knuckle 140 may be rotatably coupled to at least a portion of the driving unit 150. For example, the knuckle 140 may be coupled to the driving unit 150 and rotate with respect to the driving unit 150 by driving force transmitted from the driving unit 150.

The knuckle 140 may be provided so that the driving unit 150 is coupled to the upper end and the second connecting member 192 is coupled to the lower end. The knuckle 140 may be rotatably coupled to the second connecting member 192. For example, when the knuckle 140 rotates due to the driving force of the driving unit 150, the knuckle 140 may rotate relative to the driving unit 150 and the second connecting member 192.

The driving unit 150 may provide driving force to rotate the wheel 120. For example, the driving unit 150 may control the direction of the wheel 120 connected to the knuckle 140 by generating a rotational driving force to rotate the knuckle 140.

The driving unit 150 may include a motor 160 that provides driving force and a reducer 170 that converts the output of the motor 160. The driving unit 150 may be configured so that, when adjusting the rotation angle of the wheel 120, the reducer 170 and the motor 160 do not rotate together with the wheel 120 but are fixed to the connecting member 190. For example, the motor 160 may be connected by the first connecting member 191 and the position thereof may be fixed with respect to the chassis module 111 when the knuckle 140 and the wheel 120 rotate. In addition, for example, the reducer 170 is connected by the first connecting member 191 and some components that transmit rotational force to the knuckle 140 when the knuckle 140 and the wheel 120 rotate are rotated together with the knuckle 140, but the position of the reducer 170 itself may be fixed with respect to the chassis module 111.

The steering device 130 may be connected to the chassis module 111 (for example, the body 110 of the vehicle 100) through the connecting member 190. The driving unit 150 of the steering device 130 may be coupled to the first connecting member 191. The knuckle 140 of the steering device 130 may be connected to the second connecting member 192.

The driving unit 150 may include coupling portions 172a and 172b to which the first connecting member 191 is coupled. The coupling portions 172a and 172b may include a first coupling portion 172a and a second coupling portion 172b provided on an opposite side of the first coupling portion 172a. For example, the first coupling portion 172a may be formed in the first direction ① (for example, downward direction with respect to FIG. 5), and the second coupling portion 172b may be formed in the second direction ② (for example, upward direction with respect to FIG. 5) opposite to the first direction ①.

Referring to FIG. 4, the driving unit 150 may be located lower than the wheel 120. For example, the driving unit 150 may not protrude above the wheel 120 but may be located within the diameter of the wheel 120.

The components of the steering device 130 are described in more detail below with reference to FIGS. 7 and 8.

The connecting member 190 may include a first connecting member 191 connecting the driving unit 150 of the steering device 130 to the chassis module 111 and may include a second connecting member 192 connecting the knuckle 140 of the steering device 130 to the chassis module 111.

The first connecting member 191 may include a first connection portion 193 coupled to one side of the driving unit 150 and a second connection portion 194 coupled to the other side of the driving unit 150. For example, the first connection portion 193 may be configured such that one end is fixed to the chassis module 111 and the other end is coupled to the first coupling portion 172a provided in the driving unit 150. The second connection portion 194 may be configured such that one end is fixed to the chassis module 111 and the other end is coupled to the second coupling portion 172b provided in the driving unit 150. The first connecting member 191 has a structure in which the first connection portion 193 and the second connection portion 194 are formed integrally or in which the first connection portion 193 and the second connection portion 194 may be composed of separate parts.

The second connecting member 192 may be coupled to the lower end of the knuckle 140. The second connecting member 192 may be rotatably coupled to the lower end of the knuckle 140. As illustrated in FIG. 4, when the steering device 130 and the connecting member 190 are viewed from the front, the knuckle 140 may be located between the first connecting member 191 and the second connecting member 192.

The connecting member 190 supports the steering device 130 and the wheel 120 through the first connecting member 191 disposed in the upper portion and the second connecting member 192 disposed in the lower portion, thereby providing a double wishbone type suspension structure. For example, the first connection portion 193 of the first connecting member 191 may be referred to as an upper link, the second connection portion 194 of the first connecting member 191 may be referred to as an upper arm, and the second connecting member 192 may be referred to as a lower arm.

Figure 6A:
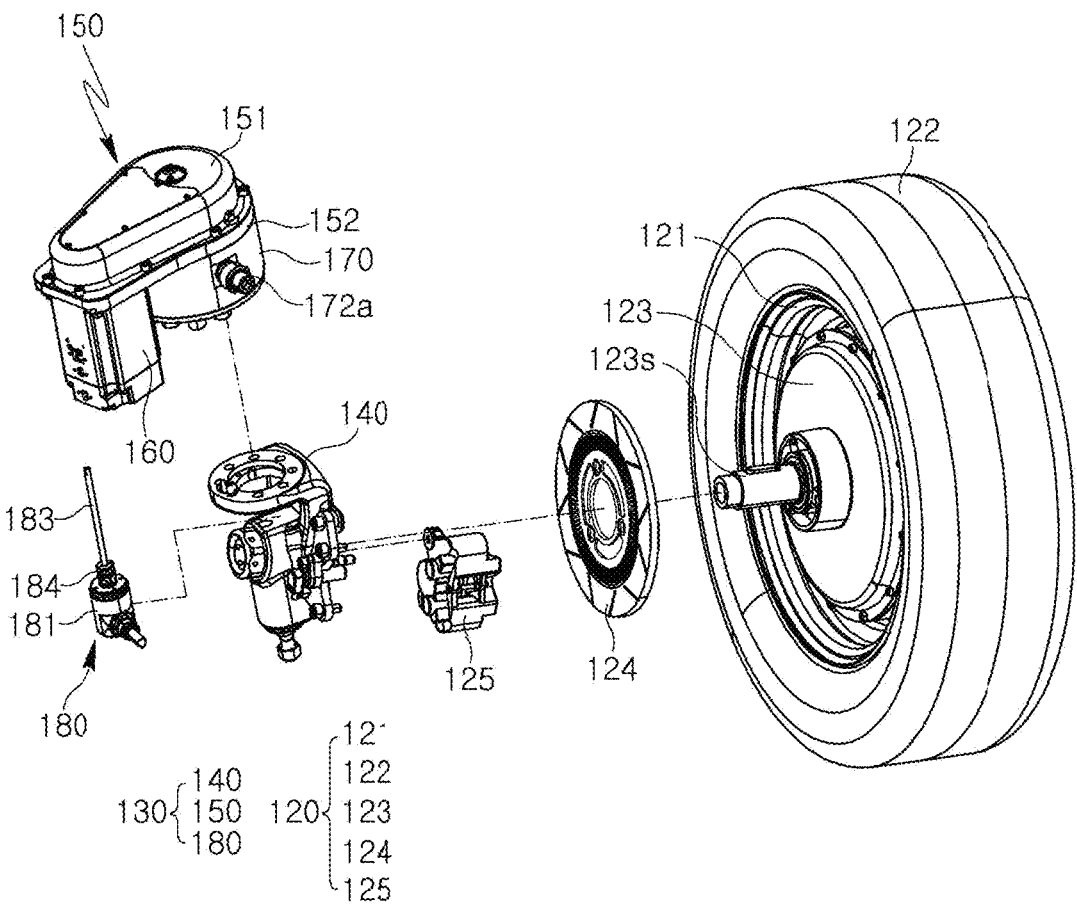
FIG. 6A is a perspective view illustrating a state in which a steering device according to an embodiment is disassembled from a wheel.
Figure 6B:
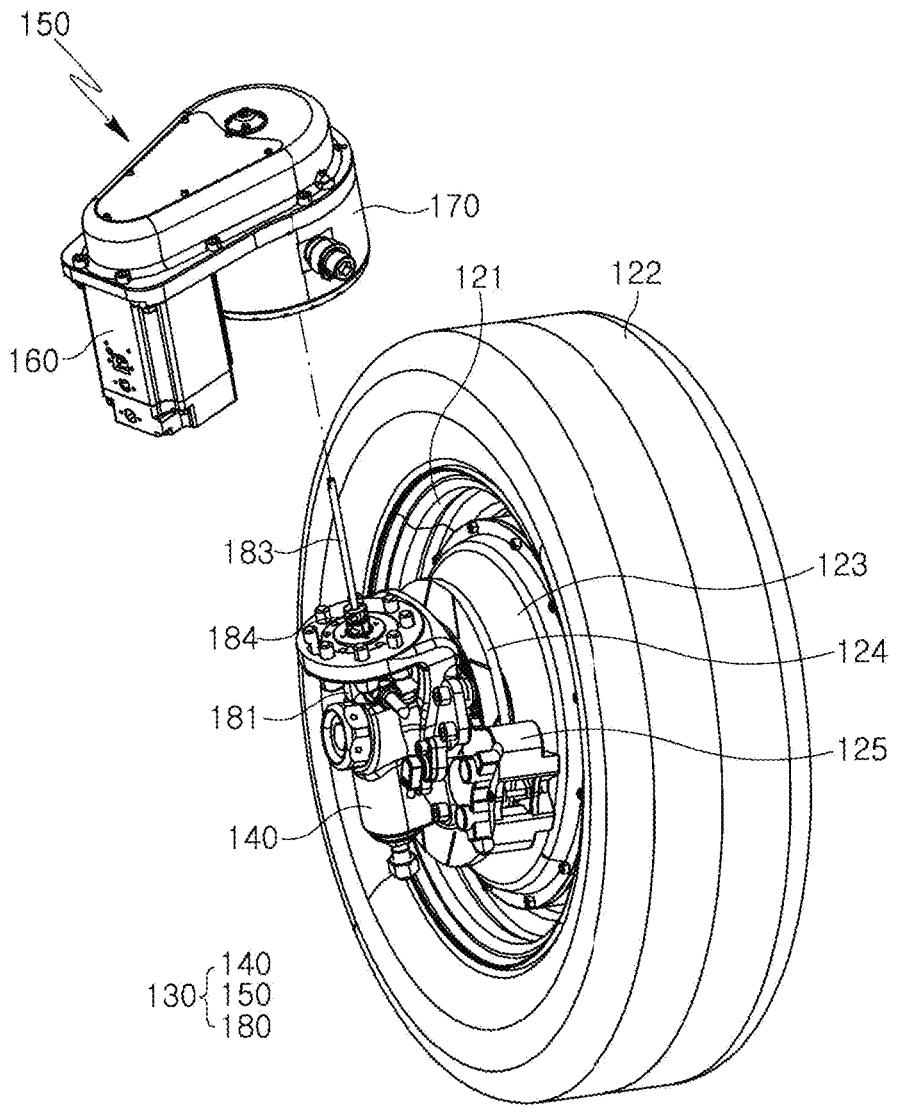
FIG. 6B is a perspective view illustrating a knuckle in FIG. 6A being coupled to a wheel and a driving unit disassembled from the knuckle.
Figure 6C:
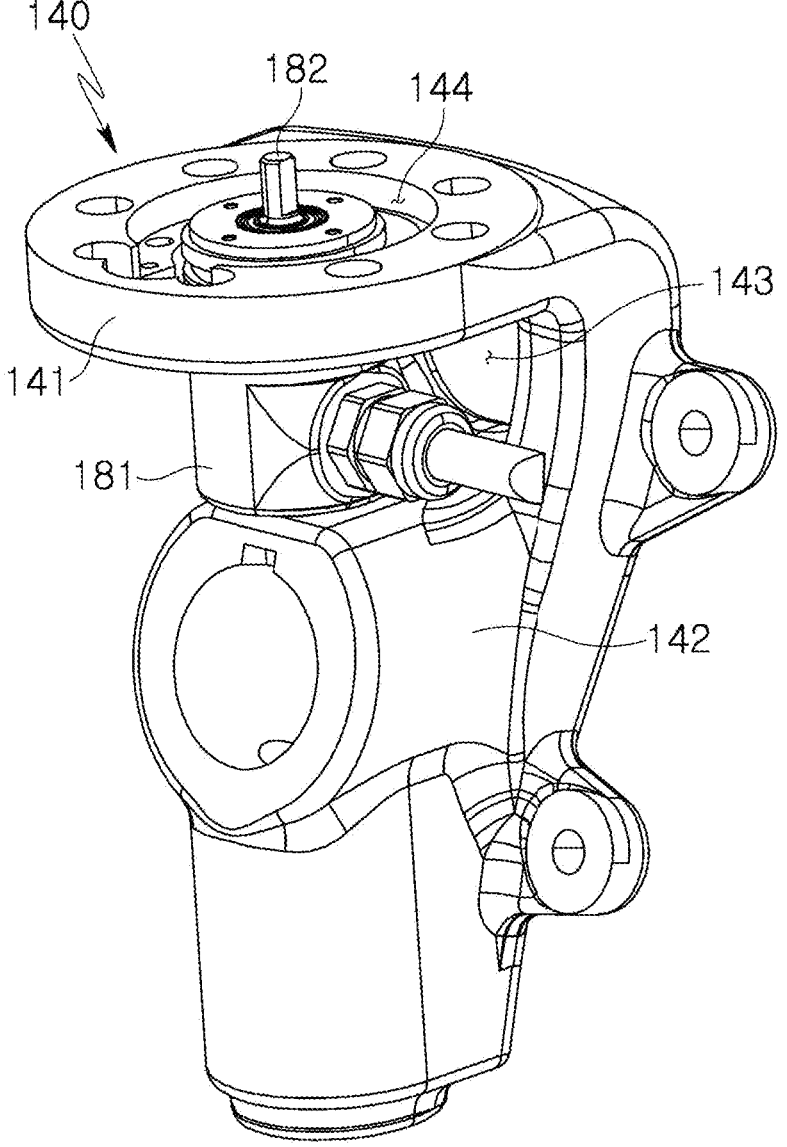
FIG. 6C is a perspective view illustrating the knuckle to which the steering angle measuring device in FIG. 6A is coupled.
Figure 6D:
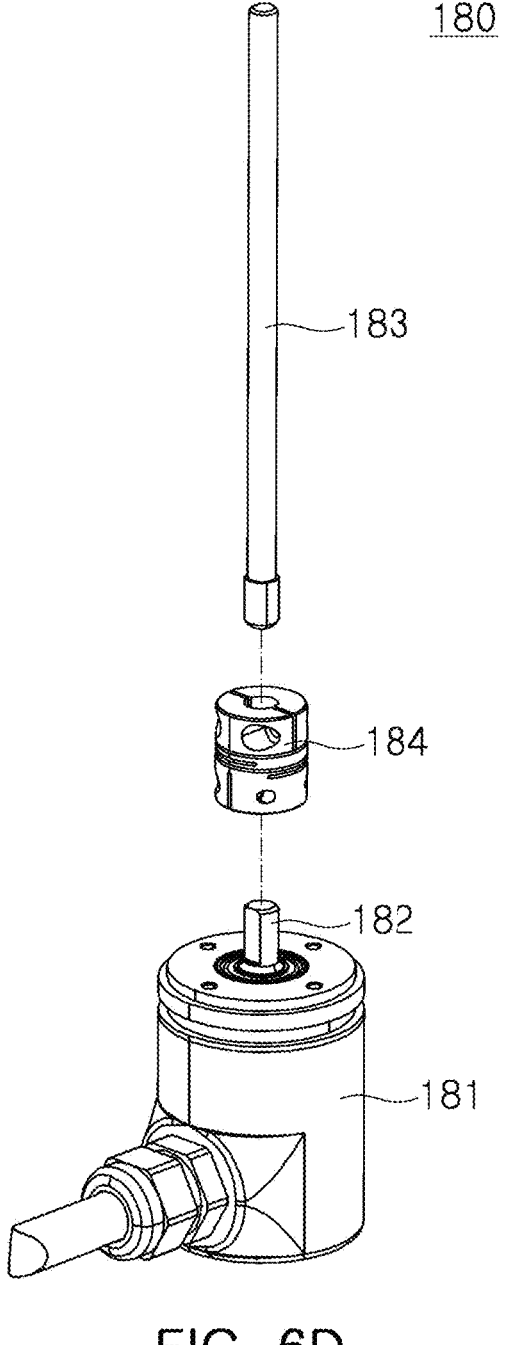
FIG. 6D is a perspective view illustrating the steering angle measuring device illustrated in FIG. 6A in a disassembled state.

FIG. 6A is a perspective view illustrating the steering device 130 in a disassembled state from the wheel 120 according to an embodiment. FIG. 6B is a perspective view illustrating the knuckle 140 coupled to the wheel 120 and the driving unit 150 disassembled from the knuckle 140 in FIG. 6A. FIG. 6C is a perspective view illustrating the knuckle 140 to which a steering angle measuring device 180 is coupled in FIG. 6A. FIG. 6D is a perspective view illustrating the disassembled state of the steering angle measuring device 180 illustrated in FIG. 6A.

FIG. 6A illustrates that the brake disc 124 is separated from the wheel 120, a braking device 125 is separated from the brake disc 124, and the steering device 130 separated from the wheel 120 is disassembled into its constituent components including the knuckle 140, the driving unit 150, and the steering angle measuring device 180.

FIG. 6C illustrates the body 181 of the steering angle measuring device 180 coupled to the knuckle 140. FIG. 6D illustrates the steering angle measuring device 180 disassembled into its constituent components including the body 181, the rod 183, and the coupling 184.

Referring to FIGS. 6A-6D, the vehicle 100 according to an embodiment may include a wheel 120 and a steering device 130. The wheel 120 may include a wheel body 121, a tire 122, an in-wheel motor 123, a brake disc 124, and a braking device 125. The steering device 130 may include a knuckle 140, a driving unit 150, and a steering angle measuring device 180.

The wheel 120 may be configured as an assembly of a form in which the tire 122 is mounted on the outer side of the wheel body 121, the in-wheel motor 123 is mounted inside the wheel body 121, the brake disc 124 is coupled to the in-wheel motor 123, and the braking device 125 is connected to the brake disc 124. On the other hand, as described above, embodiments of the present disclosure are not limited to the wheel 120 on which the in-wheel motor 123 is mounted.

The braking device 125 may apply braking force to the wheel 120 by limiting the rotation of the brake disk 124. A part of the braking device 125 is coupled and fixed to the knuckle 140 and the other part thereof is connected to the brake disc 124. The braking device 125 may be provided to apply braking force to the brake disc 124 through friction caused by contact with the brake disc.

The knuckle 140 may be coupled to the wheel 120. For example, the knuckle 140 may be coupled to a wheel shaft 123s of the wheel 120. The knuckle 140 may be fixed by being inserted into the wheel shaft 123s. The wheel shaft 123s may become the center of rotation of the wheels 121 and tires 122 when the vehicle 100 is driven. For example, the in-wheel motor 123 may be rotatably fitted to the wheel shaft 123s and the knuckle 140 may be fixed to the wheel shaft 123s. For example, when the wheel 120 rotates to move the vehicle 100, the in-wheel motor 123, wheel body 121, tire 122, and brake disc 124 rotate around the wheel shaft 123s. The knuckle 140 and the wheel shaft 123s do not rotate separately from the rotation of the in-wheel motor 123.

The knuckle 140 connects the driving unit 150 and the wheel 120 and transmits the driving force provided from the driving unit 150 to the wheel 120 to rotate the wheel 120. For example, the knuckle 140 may rotate relative to the driving unit 150 and may rotate integrally with the wheel 120. Accordingly, when the knuckle 140 rotates with respect to the driving unit 150 by the driving force of the driving unit 150, the wheel 120 rotates together with the knuckle 140 to obtain steering.

The knuckle 140 may be coupled to the reducer 170 of the driving unit 150. The knuckle 140 rotates together with some components (for example, an output unit 174) inside the reducer 170, but may rotate relative to the remaining components of the reducer 170. Accordingly, at least a portion of the reducer 170 may be rotatably coupled or connected to the knuckle 140.

The knuckle 140 may support the braking device 125, a wheel speed sensor (not illustrated), and the steering angle measuring device 180. For example, a part of the braking device 125 connected to the brake disk 124 may be coupled to the knuckle 140, and a wheel speed sensor may be coupled to the knuckle 140. The wheel speed sensor is coupled to the knuckle 140 and may detect the rotational speed of the wheel 120 according to the driving of the vehicle 100. The steering angle measuring device 180 is coupled to the knuckle 140 and may detect the rotation angle of the wheel 120 due to steering.

The driving unit 150 is coupled to the knuckle 140 and may provide driving force for rotation of the knuckle 140. The driving unit 150 may include a motor 160, a reducer 170, a bracket 152, and a cover 151.

The reducer 170 may be provided with, on the outer side surface, the coupling portions 172a and 172b to which the first connecting member 191 is coupled. The coupling portions 172a and 172b may protrude from the outer side surface of the reducer 170. In this case, the outer side surface of the reducer 170 refers to the outer surface of the housing (for example, the housing 172 in FIGS. 7 and 8) of the reducer 170.

The detailed configuration of the driving unit 150 is described in more detail below with reference to FIGS. 7 and 8.

The steering angle measuring device 180 may be coupled to the knuckle 140. At least a portion of the steering angle measuring device 180 may be inserted into the reducer 170. Some parts of the steering angle measuring device 180 rotate together with the knuckle 140, while others do not rotate and are fixed relative to the rotational movement of the knuckle 140, and thus the rotation angle of the knuckle 140 may be directly measured.

The steering angle measuring device 180 may be coupled to a portion of the knuckle 140 to which the reducer 170 is coupled. For example, the knuckle 140 may include a first coupling portion 141 to which the reducer 170 of the driving unit 150 is coupled and a second coupling portion 142 to which the wheel 120 is coupled. A recess 143 may be formed between the first coupling portion 141 and the second coupling portion 142. The steering angle measuring device 180 is located inside the recess 143 and at least a portion thereof may be press-fitted into the coupling hole 144 of the first coupling portion 141 and coupled thereto.

The steering angle measuring device 180 may include a body 181, a shaft 182 rotatably connected to the body 181, a rod 183 connected to the shaft 182 to rotate integrally with the shaft 182, and a coupling 184 connecting the shaft 182 and the rod 183. For example, the shaft 182, coupling 184, and rod 183 may rotate relative to body 181. The steering angle measuring device 180 may detect the degree of rotation of the shaft 182 and the rod 183 relative to the body 181 and measure the rotation angle of the knuckle 140 based thereon.

On the other hand, the configuration connecting the rod 183 and the shaft 182 is not limited to the coupling 184, and various parts may be used to connect the rod 183 and the shaft 182 so that they rotate integrally.

The body 181 is coupled to the knuckle 140 (for example, the first coupling portion 141) and may rotate together with the knuckle 140. The shaft 182, rod 183, and coupling 184 may be inserted into the interior of the reducer 170, and the rod 183 may pass through the reducer 170 (e.g., an additional portion of the reducer 170) and the bracket 152 to extend to the inside of the cover 151. The arrangement structure of the steering angle measuring device 180 is described in more detail below with reference to FIG. 8.

The body 181 and the shaft 182 of the steering angle measuring device 180 may be referred to as a rotary encoder module. For example, the steering angle measuring device 180 according to an embodiment may be provided as a structure in which the rod 183 is coupled to the shaft 182 of the rotary encoder module, but the length of the shaft 182 is extended by allowing the rod 183 to rotate integrally with the shaft 182. The rotary encoder is a well-known technology in the relevant technical field, and thus a detailed description thereof has been omitted.

On the other hand, the structure of the steering angle measuring device 180 is not limited to the illustrated embodiment. According to various embodiments, the steering angle measuring device 180 may be modified in a form in which the shaft 182 is elongated without including the rod 183.

Figure 7:
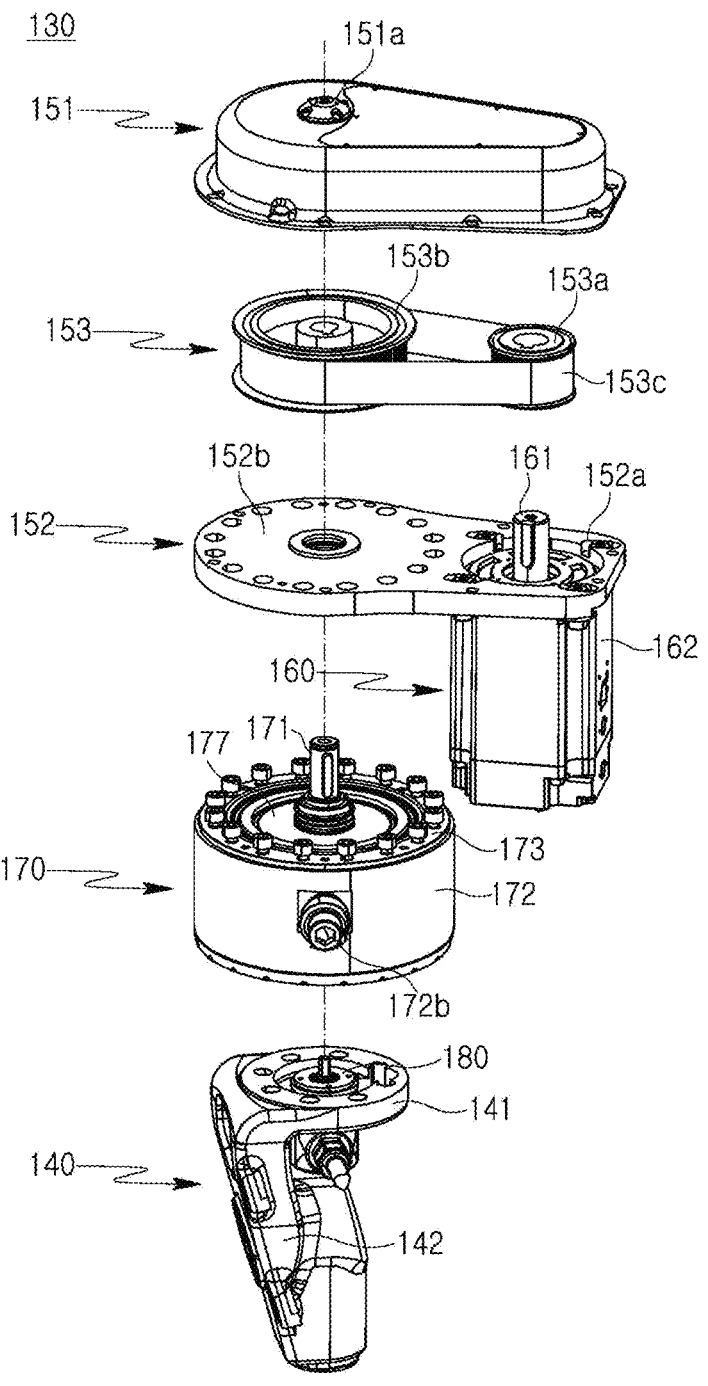
FIG. 7 is an exploded perspective view illustrating a disassembled state of a steering device according to an embodiment.

FIG. 7 is an exploded perspective view illustrating the disassembled state of the steering device 130 according to an embodiment. FIG. 8 is a cross-sectional perspective view illustrating the steering device 130 in a combined state according to an embodiment.

Figure 8:
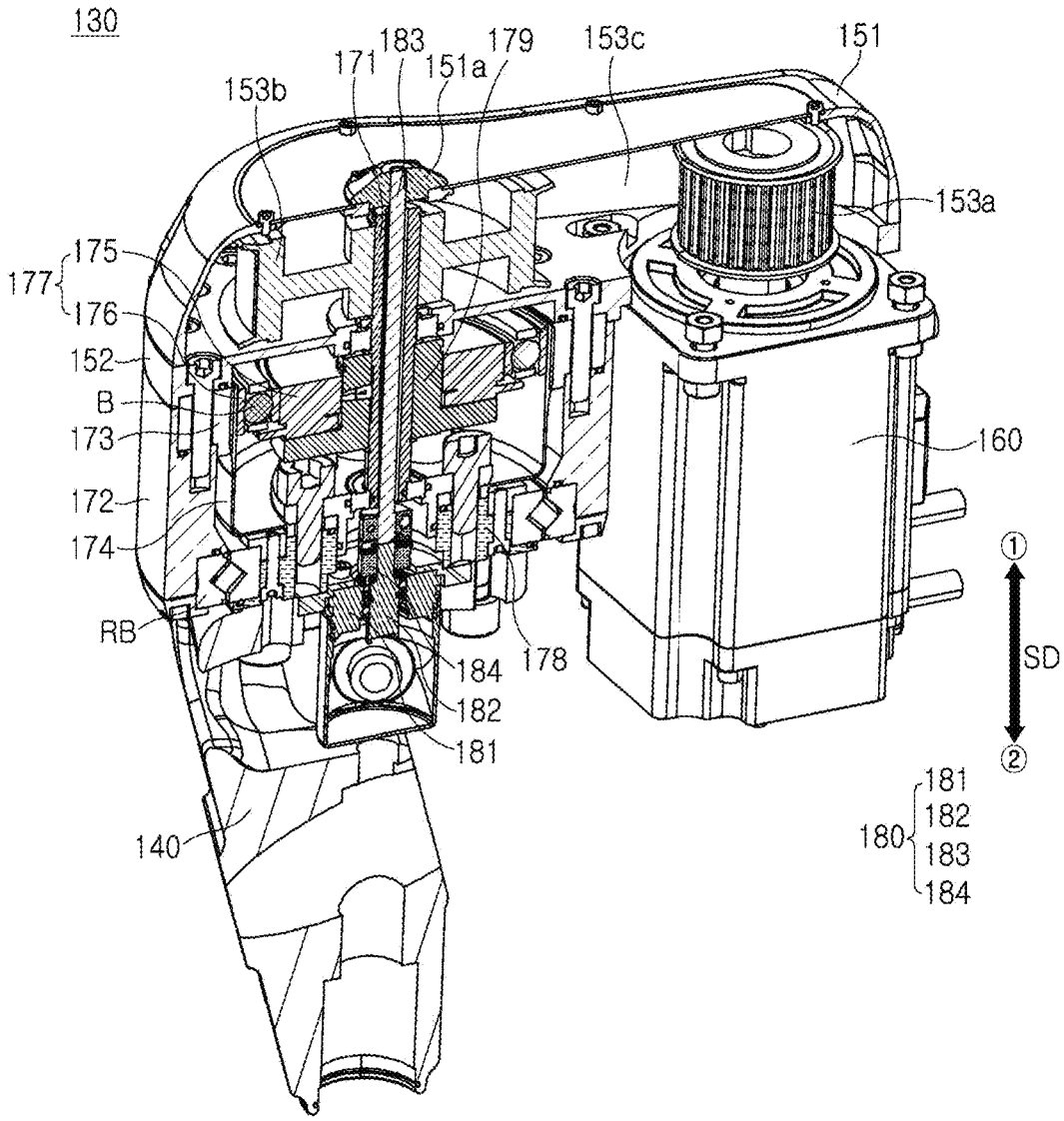
FIG. 8 is a cross-sectional perspective view illustrating a combined state of a steering device according to an embodiment.

FIGS. 7 and 8 are exploded perspective and cross-sectional perspective views of the steering device 130 illustrated in FIGS. 1-6D. FIGS. 1-6D are referred to in the description of FIGS. 7 and 8. An overlapping or duplicative description of FIGS. 1-6D has been omitted below.

Referring to FIGS. 7 and 8, the steering device 130 according to an embodiment may include a knuckle 140 and a driving unit 150 coupled to the knuckle 140.

The knuckle 140 may include a first coupling portion 141 to which the driving unit 150 is coupled and a second coupling portion 142 to which the wheel 120 is coupled. The second coupling portion 142 may extend downward from the first coupling portion 141. The first coupling portion 141 may be coupled to the reducer 170 of the driving unit 150. The second coupling portion 142 may be coupled to the wheel 120 as the wheel shaft 123s passes through at least a portion thereof.

The knuckle 140 is connected to the output unit 174 of the reducer 170 and may rotate by rotation of the output unit 174. The knuckle 140 may rotate relative to the housing 172 and the motor 160 of the reducer 170. For example, the knuckle 140 rotates together with the output unit 174 when the output unit 174 rotates and when the knuckle 140 rotates, and the housing 172 of the reducer 170 and the motor 160 may remain fixed without rotating.

According to some examples, the steering angle measuring device 180 may be a rotary encoder for measuring the steering angle of the wheel 120 may be disposed on the knuckle 140.

The driving unit 150 may include a motor 160, a reducer 170, a bracket 152, a power transmission member 153, and a cover 151. In the case of the driving unit 150, by disposing the motor 160 and the reducer 170 in parallel and transmitting the power of the motor 160 to the reducer 170 through the power transmission member 153, the axial direction (SD) length of the driving unit 150 may be reduced.

The motor 160 may provide driving force for rotation of the knuckle 140. The motor 160 may be a servomotor but is not limited thereto. The rotation direction and/or rotation speed of the motor 160 may be controlled by a control unit (not illustrated) (for example, the control unit CU in FIG. 10).

The motor 160 may be coupled to and fixed to the bracket 152. The motor 160 may be coupled to a first portion 152a of the bracket 152. The motor 160 is coupled to the lower surface of the bracket 152 and a first rotation shaft 161 of the motor 160 may pass through the bracket 152 and be located on the upper part of the bracket 152. In this case, the lower surface of the bracket 152 is a surface facing the second direction (0) where the knuckle 140 is located, and the upper surface of the bracket 152 is a surface opposite to the lower surface and is a surface facing the first direction (0) where the cover 151 is located.

The motor 160 may be combined with the power transmission member 153. For example, the first rotation shaft 161 of the motor 160 may be coupled to the power transmission member 153. The rotation of the first rotation shaft 161 may be transmitted to the reducer 170 through the power transmission member 153.

The reducer 170 may convert the driving force provided from the motor 160 into torque required for steering the wheel 120. For example, the reducer 170 may transmit the rotational force transmitted from the motor 160 to the knuckle 140, thereby implementing rotation of the knuckle 140.

The reducer 170 may be fixed by being coupled to the bracket 152. The reducer 170 may be coupled to the second portion 152b of the bracket 152 of the motor 160. The reducer 170 is coupled to the lower surface of the bracket 152, and the second rotation shaft 171 of the reducer 170 may pass through the bracket 152 and be located on the upper part of the bracket 152.

The reducer 170 may be combined with the power transmission member 153 to receive the rotational force of the motor 160. For example, the second rotation shaft 171 of the reducer 170 is coupled with the power transmission member 153 and the second rotation shaft 171 may receive the rotational force of the first rotation shaft 161 through the power transmission member 153.

The bracket 152 may be configured to be coupled to the motor 160 and the reducer 170 with the respective rotation shafts 161 and 171 positioned parallel to each other. For example, the motor 160 and the reducer 170 may be coupled to the bracket 152 such that the first rotation shaft 161 and the second rotation shaft 171 are disposed in parallel and spaced apart by a certain distance. The motor 160 and the reducer 170 may be coupled to the bracket 152 through various coupling units.

The bracket 152 is formed in a plate shape with a predetermined size and the motor 160 and the reducer 170 are coupled to the lower surface of the bracket 152 but may be coupled to different portions thereof. The bracket 152 may include a first portion 152a to which the motor 160 is coupled and a second portion 152b, which extends from the first portion 152a and to which the reducer 170 is coupled. The bracket 152 may have a structure in which the first portion 152a and the second portion 152b are formed integrally. In other words, the first portion 152a and the second portion 152b are not physically separated or distinguished parts and it may be understood that it is intended to separately refer to the part where the motor 160 is coupled and the part where the reducer 170 is coupled throughout the bracket 152.

The bracket 152 may have a through-hole through which the first rotation shaft 161 of the motor 160 and the second rotation shaft 171 of the reducer 170 pass. For example, the body 162 of the motor 160 and the housing 172 of the reducer 170 are respectively fixedly coupled to the lower surface of the bracket 152. The first rotation shaft 161 of the motor 160 and the second rotation shaft 171 of the reducer 170 may be located on the upper surface of the bracket 152 through the through-hole.

The first rotation shaft 161 of the motor 160 and the second rotation shaft 171 of the reducer 170 may be disposed on the upper surface of the bracket 152. A power transmission member 153 may be connected to the first rotation shaft 161 and the second rotation shaft 171.

The power transmission member 153 may be provided to transmit the rotational movement of the first rotation shaft 161 of the motor 160 to the second rotation shaft 171 of the reducer 170 to rotate the second rotation shaft 171. The power transmission member 153 may be coupled to the first rotation shaft 161 and the second rotation shaft 171 on the upper surface side of the bracket 152.

The power transmission member 153 is a component for transmitting rotational motion by connecting the first rotation shaft 161 of the motor 160 and the second rotation shaft 171 of the reducer 170 disposed in parallel. A structure in which the motor 160 and the reducer 170 are separated and disposed in parallel may be obtained by providing the power transmission member 153.

The power transmission member 153 may include a first pulley 153a coupled to the first rotation shaft 161, a second pulley 153b coupled to the second rotation shaft 171, and a belt 153c connecting the first pulley 153a and the second pulley 153b to each other. For example, when the first pulley 153a rotates due to rotation of the first rotation shaft 161, the rotation of the first pulley 153a is transmitted to the second pulley 153b through the belt 153c and the second rotation shaft 171 may rotate by rotation of the second pulley 153b. The power transmission member 153 may provide primary deceleration before deceleration by the reducer 170 while transmitting the power of the rotational movement.

On the other hand, the type, shape and/or structure of the power transmission member 153 is not limited to the illustrated embodiment and may be modified into various forms within a range that may transmit the rotational movement of the first rotation shaft 161 to the second rotation shaft 171. According to various embodiments, the power transmission member 153 may be implemented using gears or chains.

The cover 151 may be coupled to the upper surface of bracket 152. The cover 151 may be coupled to the upper surface of the bracket 152 and cover the first rotation shaft 161, the second rotation shaft 171, and the power transmission member 153 located on the upper surface of the bracket 152. The cover 151 may have a predetermined space inside, in which the first rotation shaft 161, the second rotation shaft 171, and the power transmission member 153 may be accommodated.

According to various embodiments, the assembly in which the cover 151 and the bracket 152 are coupled to each other may be referred to as a support member that supports a drive system including the motor 160, the reducer 170, and the power transmission member 153.

Referring to FIG. 8, the reducer 170 may be implemented using a harmonic drive reducer. The components of the harmonic drive reducer are described below. However, the harmonic drive reducer is merely an example of a reducer 170 according to one embodiment of the present disclosure. In another embodiment of the present disclosure, the reducer 170 is not necessarily limited to a harmonic drive reducer, and instead various other types of reducers may be used.

The reducer 170 may include a housing 172, an input unit 177, an output unit 174, and a fixing portion 173.

The housing 172 is formed in a cylindrical shape, and the input unit 177, the fixing portion 173, and the output unit 174 may be disposed therein. The housing 172 may be coupled to the bracket 152. The housing 172 may form at least a portion of the exterior of the reducer 170.

The input unit 177 may include an inner ring 175 connected to the second rotation shaft 171 of the reducer 170 and formed of an oval and may include an outer ring 176 elastically deformed to protrude in the long axis direction according to the rotation of the inner ring 175 by a plurality of balls B on the outside of the inner ring 175. The input unit 177 may be referred to as a wave generator of a harmonic drive reducer.

The inner ring 175 has a substantially thin elliptical pillar shape and may rotate by receiving the rotational force of the second rotation shaft 171. The balls B outside the inner ring 175 may perform a rolling contact movement inside the outer ring 176 according to the rotation of the inner ring 175. At this time, the outer ring 176 may be formed in a ring shape with elasticity to protrude in the direction of the major axis of the inner ring 175 and retract in the direction of the minor axis.

The input unit 177 may be connected to the second rotation shaft 171 to rotate by rotation of the second rotation shaft 171. The input unit 177 may be connected to receive the rotational movement of the second rotation shaft 171 through the coupling member 179. For example, a coupling member 179 may be inserted into the inner ring 175 of the input unit 177 and the coupling member 179 may be connected to the second rotation shaft 171. Accordingly, when the second rotation shaft 171 rotates by receiving the rotational force of the first rotation shaft 161, the inner ring 175 of the input unit 177 connected to the second rotation shaft 171 via the coupling member 179 rotates together. The inner ring 175 may rotate around the second rotation shaft 171. According to various embodiments, the coupling member 179 may include a pulley, but is not limited thereto.

The output unit 174 has a hollow cylindrical shape, and may have a shape such as a container in which one side is open and the other side is closed. The input unit 177 is coupled to one inner peripheral surface of the output unit 174. The output unit 174 may have one end area at one side facing the outer ring 176 of the input unit 177, elastically deformed in response to the elastic deformation of the outer ring 176 of the input unit 177. In this case, one side refers to the first direction (0) toward the side where the cover 151 is disposed among the directions parallel to the axial direction (SD), and the other side refers to the second direction (0) facing opposite to the first direction (1) and toward the side where the knuckle 140 is disposed. The output unit 174 may be referred to as the flex spline of the harmonic drive reducer.

The coupling member 179 may be disposed inside the output unit 174 while being coupled to the input unit 177. An outer tooth may be provided on one outer peripheral surface of the output unit 174. The outer teeth of the output unit 174 may be formed to partially engage with the inner teeth of the fixing portion 173.

The output unit 174 is connected to the knuckle 140 and may rotate together with the knuckle 140. For example, the other side of the output unit 174 may be connected to the knuckle 140. The other side of the output unit 174 may be connected to the knuckle 140 through the fixing member 178, and the rotational movement of the output unit 174 may be transmitted to the knuckle 140. For example, the other side of the output unit 174 may be coupled to the fixing member 178, and the fixing member 178 may be coupled to the knuckle 140. In various embodiments, the fixing member 178 may be referred to as a bush structure.

The output unit 174 may rotate around the second rotation shaft 171 together with the knuckle 140. For example, the kingpin axis (for example, kingpin axis 145 in FIG. 4), which is the rotation center of the knuckle 140, may pass through the center of the second rotation shaft 171, and the kingpin axis 145 may be parallel to the first rotation shaft 161 of the motor 160. The output unit 174 may rotate 360°, and thus a steering angle of 90° or more may be implemented.

A roller bearing RB may be disposed between the fixing member 178 and the housing 172. For example, the roller bearing RB may be provided between the inner peripheral surface of the other side of the housing 172 and the outer peripheral surface of the fixing member 178. The fixing member 178 connected to the output unit 174 may output deceleration rotational force while rotating inside the roller bearing RB and the knuckle 140 may rotate by the deceleration rotational force.

The fixing portion 173 may be disposed to surround a portion of the outer peripheral surface of the output unit 174 where the outer teeth are formed. The fixing portion 173 may have an inner tooth formed on one-side inner peripheral surface at a position corresponding to the outer tooth of the output unit 174. The fixing portion 173 may be referred to as a circular spline of a harmonic drive reducer. The number of inner teeth formed on the fixing portion 173 may be greater than the outer teeth formed on the output unit 174.

The fixing portion 173 may be coupled to and fixed to the housing 172. For example, the fixing portion 173 may be fixed to the housing 172 and the bracket 152 through bolting. When the second rotation shaft 171 and the input unit 177 rotate, the fixing portion 173 and the housing 172 may be fixed to the bracket 152 and may not rotate.

In the case of the reducer 170, when the rotational motion of the first rotation shaft 161 is transmitted to the second rotation shaft 171 through the power transmission member 153, and when the input unit 177 is rotated by the rotation of the second rotation shaft 171, the output unit 174 is elastically deformed into an oval shape. Also, the outer teeth of the output unit 174 engage with the inner teeth of the fixing portion 173 in the long axis direction and rotate with respect to the relatively fixed fixing portion 173.

The rotational force of the second rotation shaft 171 may be firstly decelerated by the power transmission member 153 and then secondarily decelerated by the reducer 170. The decelerated rotational force may be transmitted to the knuckle 140 through the output unit 174 and the fixing member 178. The reduction ratio of the fixing portion 173 and the output unit 174 may be in the range of approximately 20:1 to 200:1. In one example, the reduction ratio may be about 100:1, but the present disclosure is not limited thereto.

Since the harmonic drive reducer is a well-known technology in the relevant technical field, a more detailed description of the configuration and reduction operation of the harmonic drive reducer has been omitted.

Referring to FIG. 8, the steering device 130 may include a steering angle measuring device 180 for directly measuring the rotation angle of the knuckle 140 (for example, the steering angle of the wheel 120). The steering angle measuring device 180 may include a body 181, a shaft 182, a rod 183, and a coupling 184, and these structures are described with reference to FIGS. 6A-6D above. Therefore, overlapping or duplicative descriptions thereof have been omitted and the description provided below focuses on the structure in which the steering angle measuring device 180 is coupled to the driving unit 150.

The steering angle measuring device 180 may be configured such that the body 181 rotates together with the knuckle 140 and the shaft 182, the rod 183 and the coupling 184 maintain a fixed state relative to the rotation of the body 181, to sense the relative degree of rotation of the body 181 (for example, the knuckle 140) with respect to the shaft 182.

The body 181 of the steering angle measuring device 180 may be coupled to the knuckle 140 to rotate together with the knuckle 140. The body 181 may rotate together with the output unit 174, the fixing member 178, and the knuckle 140. For example, the body 181 may be directly coupled to the knuckle 140, may be coupled to the fixing member 178 that fixes the knuckle 140 to the output unit 174, or may be directly coupled to the output unit 174.

The shaft 182 of the steering angle measuring device 180 may be rotatably connected to the body 181. For example, a bearing for rotation of the shaft 182 may be disposed between the outer peripheral surface of the shaft 182 and the inner peripheral surface of the body 181. A portion of the shaft 182 may be placed inside the body 181 and the remaining portion may protrude outside the body 181. The shaft 182 may be disposed inside the hollow formed at the center of the fixing member 178.

The rod 183 of the steering angle measuring device 180 is connected to the shaft 182 through the coupling 184 and may extend by passing through the second rotation shaft 171 of the reducer 170. A through-hole in which the rod 183 may be placed may be formed inside the second rotation shaft 171. The rod 183 may be spaced apart from the inner wall of the through-hole, to be separated from the rotation of the second rotation shaft 171. For example, the second rotation shaft 171 may be formed as hollow for placement of the rod 183. Since the outer side surface of the rod 183 is spaced apart from the inner wall of the through-hole of the second rotation shaft 171, the rotational force of the second rotation shaft 171 may not be transmitted to the rod 183 even if the second rotation shaft 171 rotates.

The rod 183 of the steering angle measuring device 180 may be coupled to the holder 151a provided on the cover 151. The holder 151a may be provided in a partial area of the cover 151 and may be fixed as an end of the rod 183 in the first direction (0) is inserted thereinto. For example, the rod 183 may extend from the shaft 182 by passing through the reducer 170 and the second pulley 153b so that the end in the first direction (0) is located inside the holder 151a. As the rod 183 is coupled to the holder 151a, the shaft 182 connected by the coupling 184 may be separated from the rotation of the body 181.

For example, the steering angle measuring device 180 has a structure in which the rod 183 and the shaft 182 are fixed to the holder 151a of the driving unit 150 and the body 181 rotates together with the knuckle 140, and may thus detect the degree to which the body 181 rotates with respect to the shaft 182. Therefore, the rotation angle (for example, the steering angle of the wheel 120) of the knuckle 140 with respect to the driving unit 150 (in detail, the housing 172 of the reducer 170 connected to the body 110 and fixed without rotation) may be measured.

As the rotational force of the first rotation shaft 161 due to the operation of the motor 160 is transmitted to the second rotation shaft 171 of the reducer 170 through the power transmission member 153, and as the output unit 174 rotates due to rotation of the second rotation shaft 171, the driving unit 150 of the steering device 130 according to an embodiment may drive the knuckle 140 coupled to the output unit 174 to rotate. At this time, the motor 160 and the housing 172 of the reducer 170 may be separated from the rotation of the knuckle 140 and remain fixed to the bracket 152, and as the housing 172 of the reducer 170 is coupled to the body 110 through the first connecting member 191, the relative position and posture of the driving unit 150 with respect to the body 110 may be fixed regardless of the rotation of the knuckle 140. The reducer 170 may be configured such that when the knuckle 140 rotates, the housing 172 is fixed to the bracket 152 and does not rotate. Some of the components disposed inside the housing 172, such as the input unit 177, the output unit 174, the fixing member 178, the coupling member 179, or the second rotation shaft 171, rotate relative to the housing 172. For example, even if the relative position and posture of the knuckle 140 and the wheel 120 with respect to the body 110 change due to the rotation of the knuckle 140, the positions and postures of the motor 160 and the reducer 170 with respect to the body 110 are maintained, and some components rotate inside the housing 172 of the reducer 170.

The driving unit 150 of the steering device 130 according to an embodiment may be configured such that the motor 160 and the reducer 170 are coupled to different areas (for example, the first portion 152a and the second portion 152b) on one surface (for example, the lower surface facing the second direction ②) of the plate-shaped bracket 152, to be disposed in parallel. The motor 160 and the reducer 170 may be coupled to the bracket 152 in the form in which the respective rotation shafts 161 and 171 penetrate through the bracket 152 and protrude from the other surface (for example, the upper surface facing the first direction ①) of the bracket 152, but are disposed in parallel at regular intervals.

Figure 9:
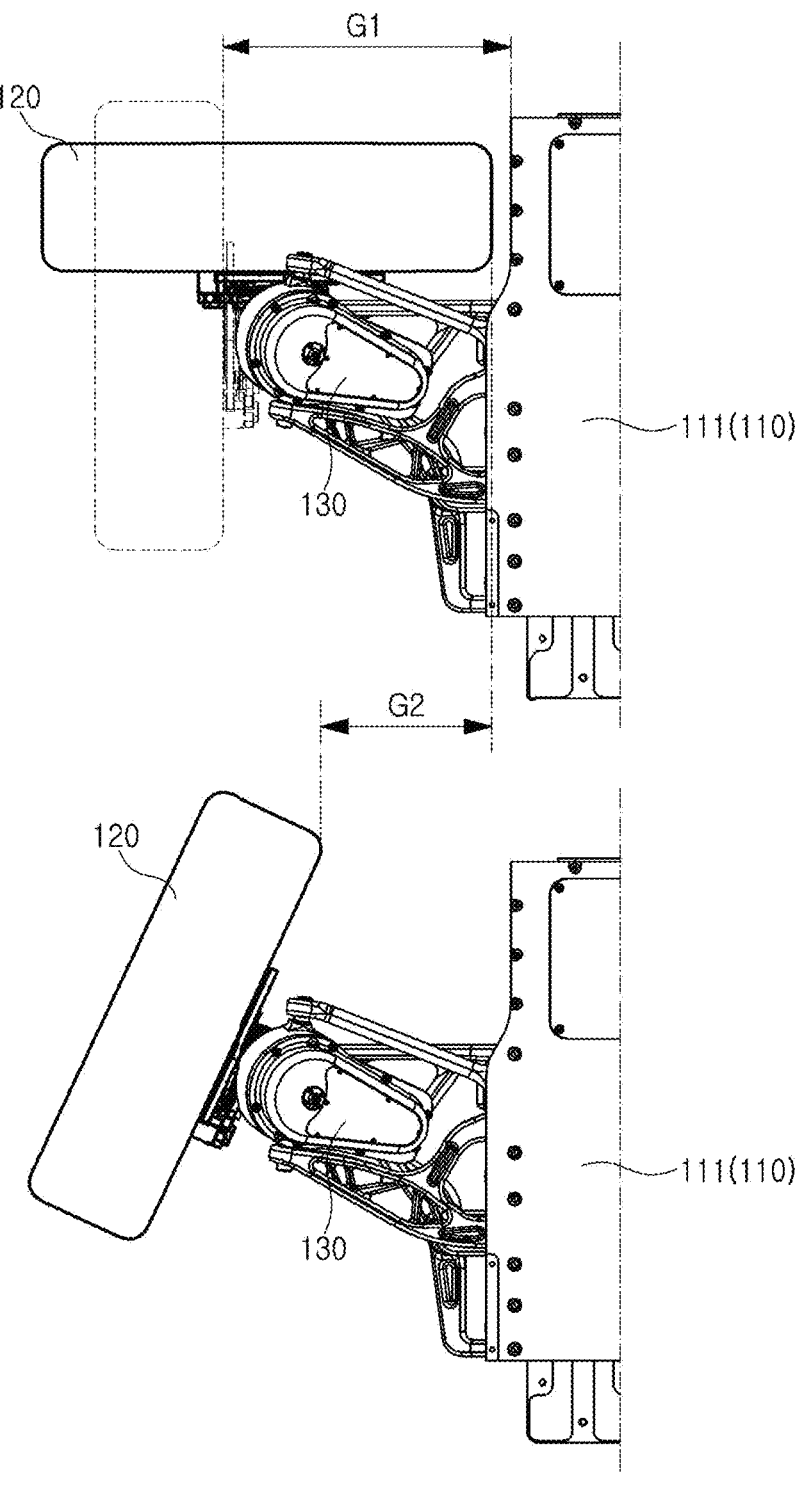
FIG. 9 is a diagram illustrating an operation in which a wheel is rotated by a steering device in a vehicle according to an embodiment.

FIG. 9 is a diagram illustrating the operation of the wheel 120 rotating by the steering device 130 in the vehicle 100 according to an embodiment.

Referring to FIG. 9, the steering device 130 according to an embodiment may rotate the wheel 120 with respect to the body 110. The steering device 130 may steer the wheel 120 by about 90 degrees or more. In a steering operation, the driving unit 150 of the steering device 130 is fixed to the body 110 and the knuckle 140 rotates with respect to the body 110 to rotate the wheel 120.

As previously described, to secure the steering angle of the wheel 120 up to 90°, a wheel house 112 of a size that does not contact the body 110 when the wheel 120 was rotated 90° is required. For example, comparing the upper and lower drawings of FIG. 9, as the steering angle of the wheel 120 is required to be up to 90°, an additional gap G2 is required in the wheel house 112, compared to the case where the wheel 120 rotates at about 40° to 50°.

As illustrated in FIG. 9, in the vehicle 100 according to an embodiment, the wheels 120 and the body 110 may be spaced apart at a predetermined distance G1 when the wheels 120 are not rotating. The predetermined gap G1 may be used as a space where at least a portion of the wheel 120 is located when the wheel 120 is rotated 90°. For example, the predetermined gap G1 between the wheel 120 and the body 110 may be smaller than the diameter of the wheel 120 and larger than the radius of the wheel 120. The steering device 130 may be mounted in the space formed by the gap G1 between the wheel 120 and the body 110.

Referring to FIG. 4 together, the steering device 130 according to an embodiment is mounted in the space between the wheel 120 and the body 110 and, in addition, has a compact structure that may reduce the axial direction (SD) length of the driving unit 150 by disposing the motor 160 and the reducer 170 of the driving unit 150 in parallel. Therefore, the driving unit 150 does not protrude above the wheel 120 or is not located higher than the wheel 120. Accordingly, since other parts or mechanisms are not located above the wheel 120, applying a low-floor platform may be facilitated.

Figure 10:
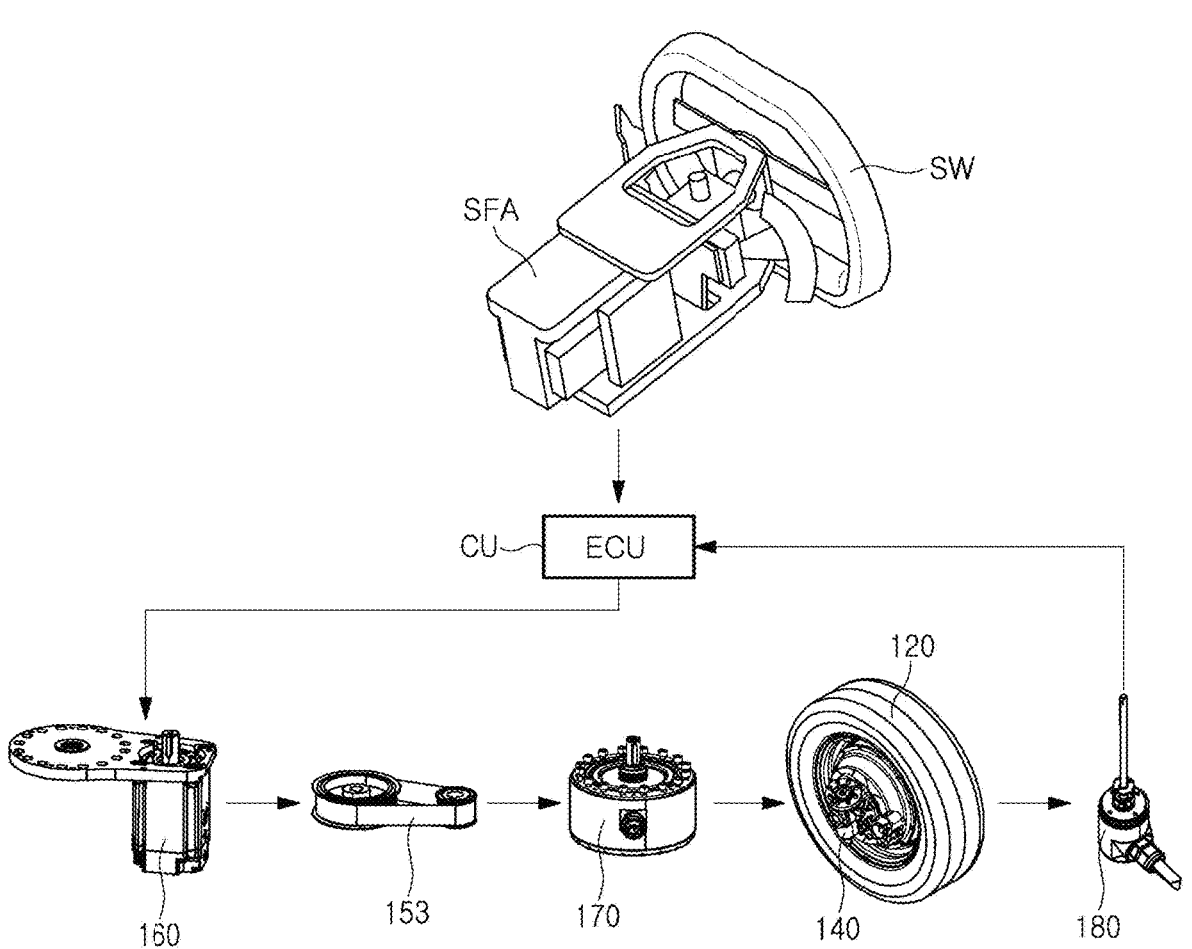
FIG. 10 is a diagram schematically illustrating a system controlling a steering device of a vehicle according to an embodiment.

FIG. 10 is a diagram schematically illustrating a system for controlling the steering device 130 of the vehicle 100 according to an embodiment.

Referring to FIG. 10, a vehicle (for example, vehicle 100 in FIG. 1) according to an embodiment may include a wheel 120, a steering device 130, a steering wheel SW, and a control unit CU. The steering device 130 may include a motor 160, a power transmission member 153, a reducer 170, a knuckle 140, and a steering angle measuring device 180. For example, vehicle 100 according to an embodiment may include a Steer-by-Wire (SbW) system.

The steering device 130 and the wheel 120 of the vehicle 100 illustrated in FIG. 10 are described above with reference to FIGS. 1-8. A redundant or duplicative description of the steering device 130 and the wheel 120 have been omitted below. FIGS. 1-8 are also referred to in the description of FIG. 10.

The steering wheel SW may receive a driver's input signal for steering the wheel 120. The driver's input signal may include the steering angle and torque of the wheel 120. The steering wheel SW may transmit the driver's input signal to the control unit CU. The steering wheel SW may be connected to an actuator (SFA; Steering Feedback Actuator) that provides reaction force of the steering wheel to the driver.

The control unit CU generates a control signal to drive the motor 160 based on the input signal input to the steering wheel SW and transmits the signal to the motor 160, thereby operating the motor 160 to rotate the wheel 120 by the steering angle included in the input signal.

The control unit CU may be referred to as an Electronic Control Unit (ECU), and the control unit CU may include at least one of a Vehicle Platform Computer (VPC), a Front Zone Unit (FZU), and a motor drive.

The motor 160 may be driven by the control unit CU. The motor 160 may generate driving force for steering the wheel 120 by rotating in a predetermined direction based on a control signal from the control unit CU.

The rotational movement of the motor 160 may be transmitted to the reducer 170 through the power transmission member 153. At this time, there may be a primary deceleration in the process of transmitting the rotational movement through the power transmission member 153.

The rotational movement of the motor 160 may be output through the output unit 174 of the reducer 170 while being secondarily decelerated in the reducer 170, and as the knuckle 140 coupled to the output unit 174 rotates, the wheel 120 rotates.

The steering angle measuring device 180 may measure the steering angle of the wheel 120 by detecting the degree of rotation of the knuckle 140 with respect to the reducer 170. The steering angle measuring device 180 may transmit the measured steering angle information to the control unit CU. The control unit CU may generate a reaction force signal for generating a steering reaction force in the steering wheel SW, based on the steering angle information received from the steering angle measuring device 180. The control unit CU may generate steering reaction force on the steering wheel SW by transmitting the reaction force signal to the steering feedback actuator (SFA).

As set forth above, according to an embodiment, the shaft of a steering angle measuring device is extended lengthwise, passes through a rotation shaft of the reducer, is fixed to a fixing portion of a driving unit, and a body of the steering angle measuring device is rotated together with a knuckle. Accordingly, the steering angle may be accurately measured by directly detecting the degree to which the knuckle is rotated relative to a vehicle body.

While example embodiments have been illustrated and described above, it should be apparent to those of ordinary skill in the art that modifications and variations may be made without departing from the scope of the present disclosure as defined by the appended claims.

What is claimed is:

1. An independent steering device comprising:
a knuckle coupled to a wheel;
a driving unit including a motor and a reducer, the motor configured to provide driving force for rotating the knuckle, at least a portion of the reducer rotatably connected to the knuckle, the reducer configured to decelerate a rotational movement of the motor and transmit the rotational movement to the knuckle; and
a steering angle measuring device coupled to the knuckle and the driving unit and configured to measure a steering angle of the wheel,
wherein the steering angle measuring device includes a body coupled to the knuckle and configured to rotate with the knuckle, a shaft rotatably coupled to the body, and a rod coaxially extending from the shaft and fixed to at least a portion of the driving unit
wherein the driving unit further includes a bracket to which the motor and the reducer are coupled to a lower surface thereof in parallel, and a cover coupled to an upper surface of the bracket; and
wherein the rod penetrates through at least an additional portion of the reducer and has one end fixed to a holder provided on the cover.

2. The independent steering device of claim 1, wherein the steering angle measuring device is configured to detect a degree to which the body rotates while the shaft and the rod maintain a fixed state relative to the body when the knuckle rotates.

3. The independent steering device of claim 1, wherein the steering angle measuring device further includes a coupling connecting the rod to the shaft.

4. The independent steering device of claim 1, wherein the rod and the shaft are integrated.

5. The independent steering device of claim 1, wherein the driving unit further includes a power transmission member disposed in a space between the cover and the bracket, configured to connect a first rotation shaft of the motor and a second rotation shaft of the reducer, and configured to transmit rotational force between the first rotation shaft and the second rotation shaft.

6. The independent steering device of claim 5, wherein:
the second rotation shaft has a through-hole penetrating therethrough in an axial direction;
the rod passes through the through-hole and is fixed to the holder; and
an outer peripheral surface of the rod is spaced apart from an inner peripheral surface of the through-hole.

7. The independent steering device of claim 5, wherein:
the motor and the reducer are coupled to the lower surface of the bracket;
the first rotation shaft and the second rotation shaft penetrate through the bracket and are located on the upper surface of the bracket; and
the power transmission member is connected to the first rotation shaft and the second rotation shaft, on the upper surface of the bracket.

8. The independent steering device of claim 5, wherein:
the reducer further includes a housing fixed to the bracket and disposed such that the second rotation shaft may rotate, and an output unit at least partially disposed inside the housing and configured to rotate relative to the housing in conjunction with rotation of the second rotation shaft; and
the knuckle is connected to the output unit to rotate integrally with the output unit.

9. The independent steering device of claim 8, wherein:
the driving unit is coupled to a vehicle body by a connecting member; and
the holder and the housing of the reducer are separated from rotation of the knuckle when the knuckle rotates and remain fixed to the vehicle body.

10. The independent steering device of claim 5, wherein:
the power transmission member includes a first pulley coupled to the first rotation shaft, a second pulley coupled to the second rotation shaft, and a belt connecting the first pulley to the second pulley; and
a rotational movement of the first rotation shaft is reduced at a predetermined reduction ratio by the power transmission member.

11. The independent steering device of claim 10, wherein:
the second pulley is inserted into the second rotation shaft; and
the rod passes through the second pulley and protrudes by a predetermined length.

12. The independent steering device of claim 1, wherein:
the knuckle includes a first coupling portion to which the reducer is coupled and a second coupling portion to which the wheel is coupled; and
the first coupling portion is provided with a coupling hole into which at least a portion of the body is inserted.

13. The independent steering device of claim 12, wherein the knuckle is provided with a recess in which at least a portion of the body is disposed between the first coupling portion and the second coupling portion.

14. The independent steering device of claim 1, wherein the reducer is a harmonic drive reducer.

* * * * *